US008656904B2

(12) United States Patent
Wortman et al.

(10) Patent No.: US 8,656,904 B2
(45) Date of Patent: Feb. 25, 2014

(54) RADIANT HEATER

(75) Inventors: Joseph A. Wortman, St. Clair Shores, MI (US); John D. Wortman, St. Clair Shores, MI (US); Kenneth L. Bachorski, Warren, MI (US); Thomas Martelle, Shelby Township, MI (US)

(73) Assignee: Detroit Radiant Products Co., Warren, MI (US)

( * ) Notice: Subject to any disclaimer, the term of this patent is extended or adjusted under 35 U.S.C. 154(b) by 638 days.

(21) Appl. No.: 12/889,814

(22) Filed: Sep. 24, 2010

(65) Prior Publication Data

US 2011/0079218 A1    Apr. 7, 2011

Related U.S. Application Data

(60) Provisional application No. 61/245,811, filed on Sep. 25, 2009.

(51) Int. Cl.
*F23C 3/00*    (2006.01)

(52) U.S. Cl.
USPC ...................................... 126/91 A; 126/91 B

(58) Field of Classification Search
USPC .............................................. 126/91 A, 91 B
See application file for complete search history.

(56) References Cited

U.S. PATENT DOCUMENTS

| | | | |
|---|---|---|---|
| 2,586,998 A * | 2/1952 | Schlenz | 122/149 |
| 3,963,018 A | 6/1976 | Schultz | |
| 4,188,571 A | 2/1980 | Brunson | |
| 4,390,125 A | 6/1983 | Rozzi | |
| 4,561,421 A | 12/1985 | Hwang | |
| 4,645,450 A | 2/1987 | West | |
| 4,676,222 A * | 6/1987 | Jones et al. | 126/91 A |
| 4,869,229 A | 9/1989 | Johnson | |

(Continued)

FOREIGN PATENT DOCUMENTS

| | | |
|---|---|---|
| CA | 1292670 | 12/1991 |
| DE | 10246431 A1 | 10/2002 |

(Continued)

OTHER PUBLICATIONS

Brochure: SV Series, unitary Vacuum System by Re-Verber Ray, 2001 Detroit Radiant Products, 2 pages.

(Continued)

*Primary Examiner* — Kenneth Rinehart
*Assistant Examiner* — Gajanan M Prabhu
(74) *Attorney, Agent, or Firm* — Howard & Howard Attorneys PLLC

(57) ABSTRACT

A heater includes a burner housing that houses burners for combusting a fuel and air mixture into heated gas. Heater tubes each extend from and return to the burner housing for radiating heat. The heater tubes each have an inlet end and an outlet end with the inlet ends in communication with the burners for receiving the heated gas from the burners. A collector box is disposed in the burner housing in communication with the outlet ends of the heater tubes for receiving the heated gas from the heater tubes. A fan is in communication with the collector box to move the heated gas from the burners to the collector box. The outlet ends of the heater tubes are adjacent each other at the burner housing and each of the inlet ends of the heater tubes are spaced in different directions from the outlet tubes at the burner housing.

22 Claims, 10 Drawing Sheets

(56) References Cited

U.S. PATENT DOCUMENTS

| | | | |
|---|---|---|---|
| 4,869,230 | A | 9/1989 | Fletcher et al. |
| 4,892,084 | A | 1/1990 | Fletcher |
| 5,027,789 | A | 7/1991 | Lynch |
| 5,076,781 | A | 12/1991 | Cremers |
| 5,112,217 | A | 5/1992 | Ripka |
| 5,292,065 | A | 3/1994 | Fiedrich |
| 5,325,821 | A | 7/1994 | Gloersen |
| 5,353,986 | A | 10/1994 | Wortman et al. |
| 5,626,125 | A | 5/1997 | Eaves |
| 5,842,854 | A | 12/1998 | Willms et al. |
| 6,138,662 | A | 10/2000 | Jones |
| 6,217,320 | B1 | 4/2001 | Eaves |
| 6,286,500 | B1 | 9/2001 | Jones |
| 6,334,439 | B1 * | 1/2002 | Specht et al. .......... 126/91 A |
| RE37,636 | E | 4/2002 | Wortman et al. |
| 6,786,422 | B1 | 9/2004 | Wortman et al. |
| 7,654,257 | B2 | 2/2010 | Vancak |
| 2006/0081580 | A1 | 4/2006 | Turner et al. |
| 2009/0042155 | A1 | 2/2009 | Turner et al. |

FOREIGN PATENT DOCUMENTS

| | | |
|---|---|---|
| EP | 0249087 | 6/1986 |
| EP | 0261639 | 3/1988 |
| FR | 2609157 | 12/1986 |
| GB | 2189314 | 11/1989 |
| GB | 2263542 | 7/1993 |

OTHER PUBLICATIONS

Brochure: DRV Series, Gas Fired Infra-Red Vacuum Tube Heater System, Detroit Radiant Products, 4 pages.
Brochure: HL-2 Series, Two Stage Gas Fired Infra-Red Tube Heater, 2000 Detroit Radiant Products, 4 pages.
Ambirad Energy Efficient Heating Systems, Document Reference No. GB/CB107/1104 (IK1104), Dennis Fairey & Associates Limited, 4 pages.
RG Roberts Gordon: Vantage TF The Twin Fire Unitary Infrared Heater, Roberts Gordon LLC, 2 pages.
Shenandoah Generation 2 Quad-Glow Heater, Quad Glow Heater, 7 pages.
Livestock Radiant Heating, X.G. Johnson Livstock Equipment (Canada) Ltd., 23 pages.
HLV Series Tube Heater Vacuum System; Tube Heater Vacuum System Installation, Operation, Maintenance and Parts Manual, Detroit Radiant Products, 36 pages.
English language abstract for DE 10246431A1 extracted from espace.com database, dated Dec. 21, 2010, 9 pages.
English language abstract for FR 2609157 extracted from espace.com database, dated Dec. 21, 2010, 10 pages.
Space-Ray, Radiant Gas Brooders, Infrared Radiant Heating for Poultry/Animal Applications, 3 pages.
Heat-Rite, VM Brooders, The Radiant Tube Heater for Brooders that Maximizes Fuel Savings, 3 pages.
RG Roberts Gordon Vantage Modulating, The Infrared Industry's 1st Fully Modulating Unitary Infrared Heater, Roberts Gordon LLC, 2 pages.
True Dual 2-Stage Heaters, Solaronics Heavy-Duty Two-Stage Gas Infra-Red Tube Heaters, Solaronics, 6 pages.
Superior Radiant Products, Produce Brochure, 2 pages.
RG Rogers Gordon Ultra Vac, Controls for Modulating CoRayVac Infrared Heating Systems, Roberts Gordon LLC, 7 pages.

* cited by examiner

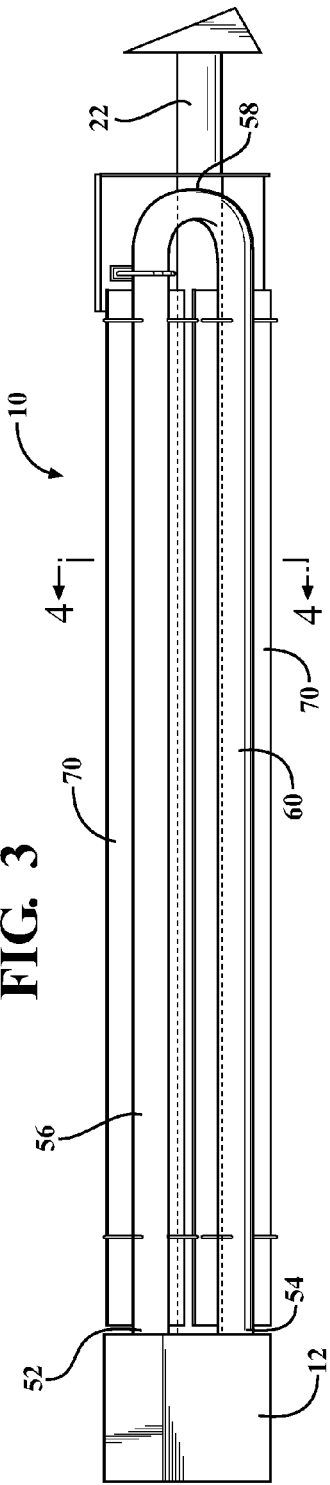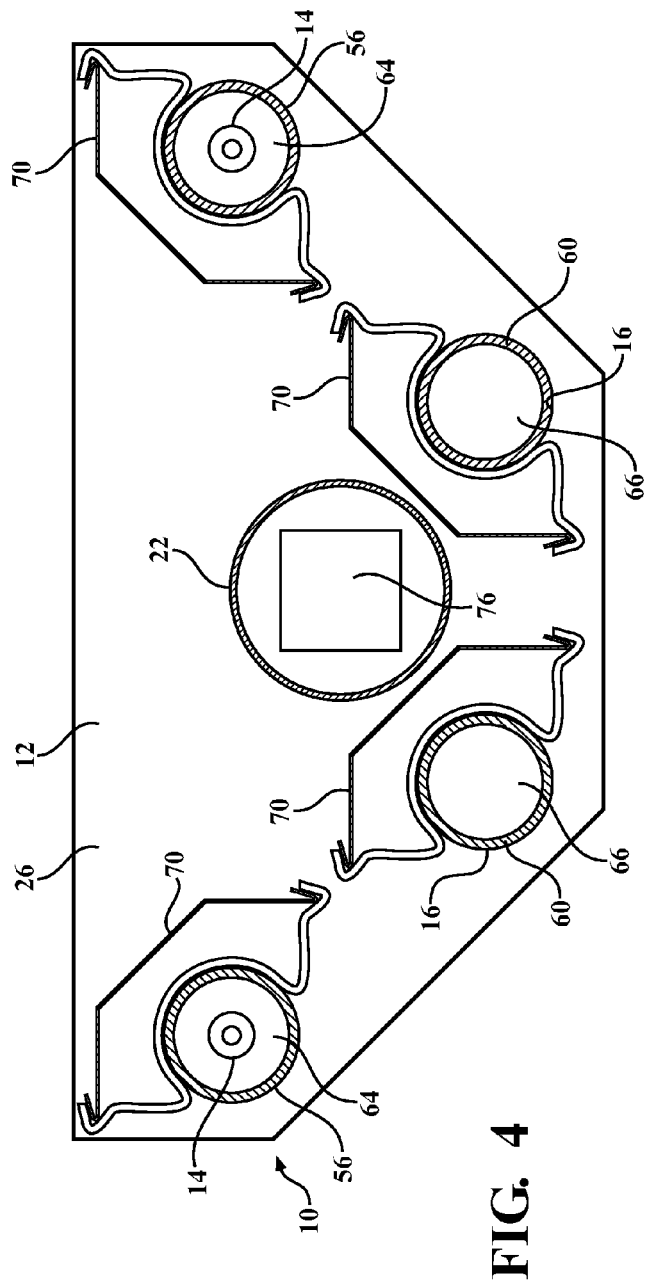

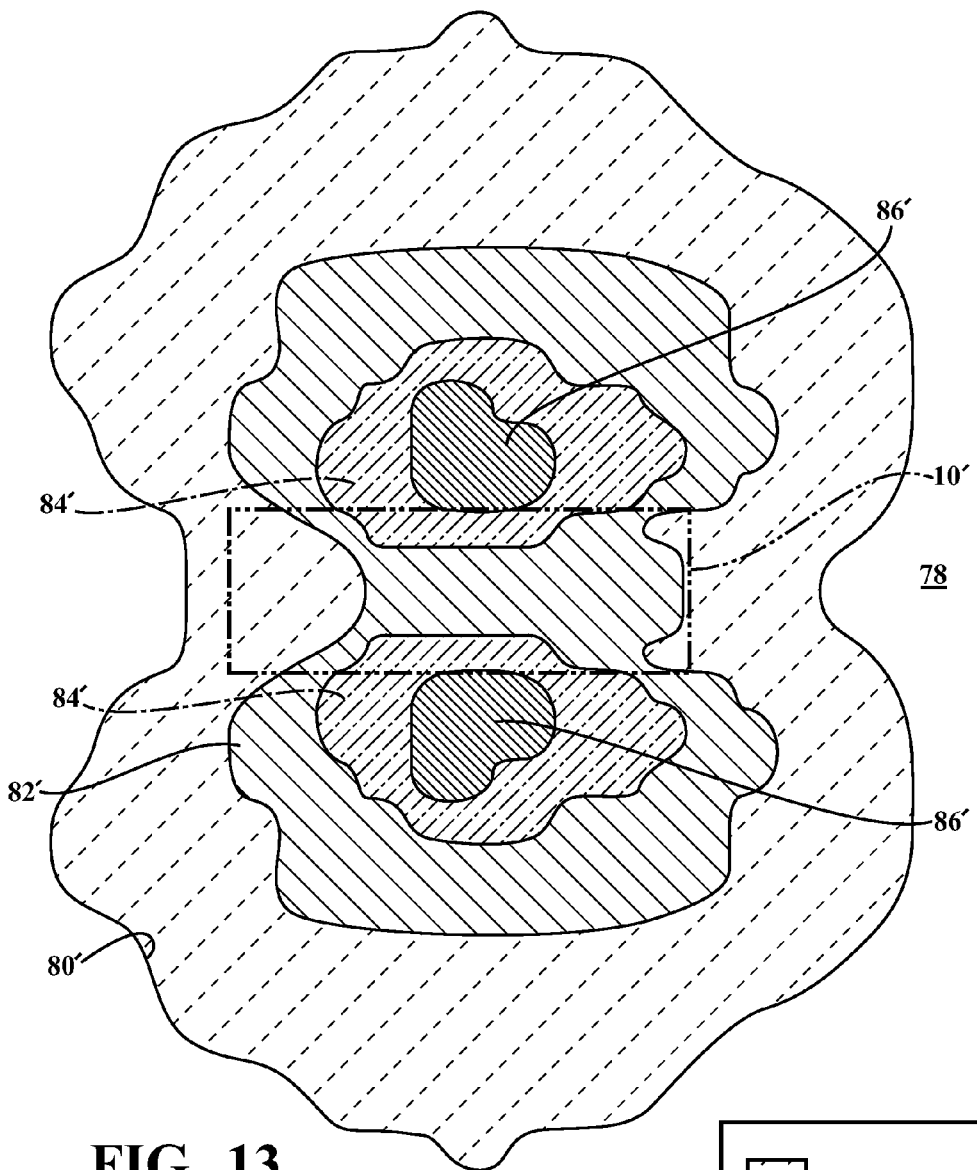
FIG. 13
Prior Art
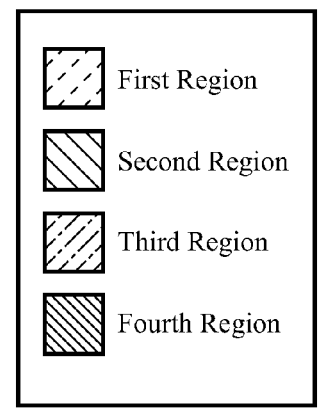

RADIANT HEATER

CROSS-REFERENCE TO RELATED APPLICATIONS

The subject patent application claims priority to and all the benefits of U.S. Provisional Patent Application No. 61/245,811 which was filed on Sep. 25, 2009, which is expressly incorporated herein by reference.

BACKGROUND OF THE INVENTION

1. Field of the Invention

The invention generally relates to a radiant heater including a burner and a heater tube that receives heated gas from the burner and radiates heat to a target area.

2. Description of the Related Art

Radiant heaters are used in many applications to provide heat to an area, such as a floor. The radiant heater is suspended above the area to radiate heat downwardly onto the area. Radiant heaters can be used in agricultural enclosures such as chick brooders, poultry barns, dairy barns, etc., to radiantly heat a floor of the enclosure on which livestock reside. Radiant heaters are also used to provide heat in many other applications such as factories, warehouses, restaurants, and patios.

The radiant heater heats the area in a heating pattern. The heating pattern is defined by a temperature rise on the area caused by the radiant heater. Difficulties occur with radiant heaters when attempting to provide a uniform heating pattern below the heater. Specifically, as shown in the prior art FIG. 13, radiant heaters generally produce a non-uniform heating pattern, i.e., a varying temperature gradient, that includes hot spots having a higher temperature than surrounding areas. The hot spots are also defined by drastic variations in temperature of short distances along the area. These hot spots are problematic in agricultural enclosures because the hot spots disadvantageously make the livestock uncomfortable. As a result, the livestock avoid the hot spots thereby decreasing the effective size of the enclosure and reducing the yield of the stock. Similarly, on other applications in which people are subjected to the heat of the radiant heater, e.g., factories, warehouses, restaurants, patios, etc., the hot spots disadvantageously make people uncomfortable such that the people try to avoid the hot spots.

In addition, radiant heaters can use surrounding ambient air for combustion. In other words, such radiant heaters combine fuel with the air surrounding the radiant heater and combust the fuel/air mixture. As such, the oxygen content in the air surrounding the radiant heater is depleted by the radiant heater. Such depletion in oxygen content can be particularly detrimental in an agricultural enclosure in which the livestock require oxygen. Further, for exemplary purposes, such depletion is especially detrimental in a chick brooder, which typically already has increased levels of ammonia.

Accordingly, there remains an opportunity to manufacture a radiant heater that beneficially addresses the deficiencies set forth above. In other words, there remains an opportunity to manufacture a radiant heater that emits a uniform heating pattern. There also remains an opportunity to manufacture a radiant heater that draws air from a remote location so as to deliver fresh air to the radiant heater without depleting oxygen content in the air surrounding the radiant heater.

SUMMARY OF THE INVENTION AND ADVANTAGES

The present invention includes a heater comprising a burner housing having an inlet for supplying air into the burner housing. A plurality of burners are each spaced from each other in the burner housing for combusting a fuel and air mixture into heated gas. A plurality of heater tubes each extend from and return to the burner housing for radiating heat. The heater tubes each have an inlet end and an outlet end with the inlet ends in communication with the burners for receiving the heated gas from the burners. A collector box is disposed in the burner housing in communication with the outlet ends of the heater tubes for receiving the heated gas from the heater tubes. A fan is in communication with the collector box to move the heated gas from the burners to the collector box. The outlet ends of the heater tubes are adjacent each other at the burner housing and each of the inlet ends of the heater tubes are spaced in different directions from the outlet tubes at the burner housing.

Such a configuration advantageously emits a low intensity and relatively uniform heat pattern to generally uniformly heat an area to a preferred temperature. Further, the configuration of the heater tubes such that the inlet ends of the heater tubes are spaced in different directions from the outlet tubes at the burner housing results in a generally uniform heat pattern. Specifically, since the inlet end receives the heated gas from the burners, the heater tubes are hotter near the inlet end. As such, the hotter inlet ends are advantageously spaced from each other further apart than the outlet ends to evenly distribute the heat emitted from the heater tubes. In other words, the hottest portion of each heater tube is located towards the perimeter of the heater to direct more energy to the perimeter of the heater. The relatively cooler portion of the heater tubes are adjacent to each other so that, in combination, these relatively cooler portions do not overheat the area directly below the relative cooler portions.

Further, because the heat originates from at least two areas, i.e., the overall heat output is split between at least two burners spaced from each other, the heat from each of the heater tubes is of a low intensity and the radiant heat pattern can be easily optimized by adjusting the heat output of either or both of the tubes. This low intensity heat pattern also spreads across a relatively larger area because the radiant heat from the separate tubes can be directed in different directions. Since the radiant heat from the separate tubes is directed in different directions, the heat pattern extends along two opposite sides of the radiant heater and is a mirror image about the radiant heater.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a side view of the heater of FIG. 1;
FIG. 4 is a cross-sectional view along Line 4-4 of FIG. 3.

FIG. 13 is a top view of a prior art heater heating an area and illustrating a prior art heating pattern.

DETAILED DESCRIPTION OF THE INVENTION

Figure 1:
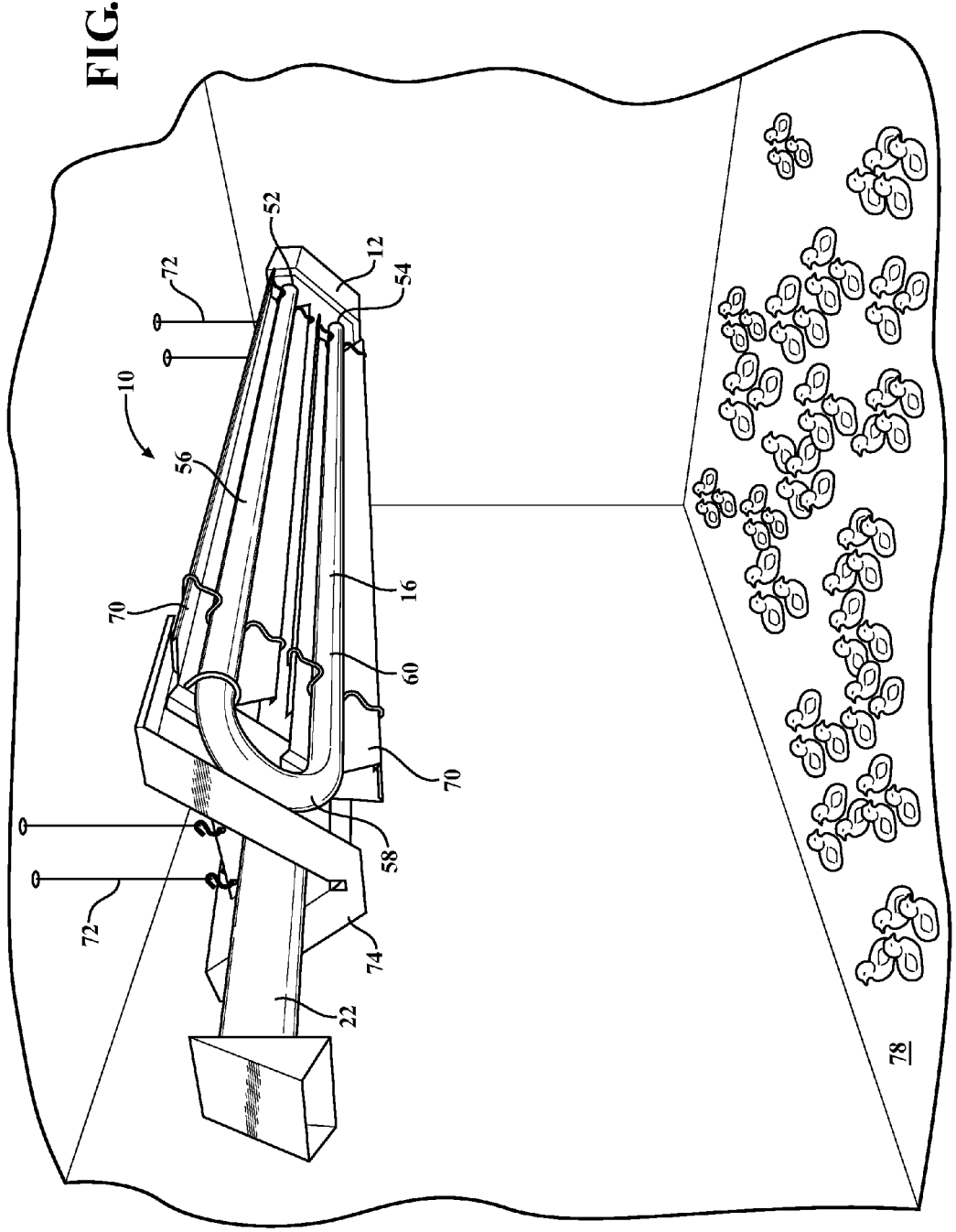
FIG. 1 is a perspective view of a heater in a chick brooder.

Referring to the Figures, wherein like numerals indicate like parts throughout the several views, a heater 10 is generally shown at 10. As shown in FIG. 1, the heater 10 is typically suspended above an area, such as floor 78, to heat the area and can be used in an agricultural enclosure such as, for example, a chick brooder. Other types of agricultural enclosures in which the heater 10 can be used includes poultry barns, dairy barns etc. The heater 10 can be used in the interior or the exterior of any type of building such as, for example, shops, restaurants, factories, warehouses, arenas, etc. Further, the heater 10 need not be used in connection with a building but can be independently suspended above any area such as, for example, a patio.

The heater 10 is more specifically a radiant tube heater that emits radiant heat in a generally balanced and uniform heat pattern. As set forth further below, the heat pattern is defined by a temperature rise on the heated area caused by the heater 10. The heater 10 is self-contained, i.e., once suspended above an area and connected to an appropriate fuel and/or electrical source, the heater 10 can radiate heat by itself without the any additional components or appliances.

Figure 2:
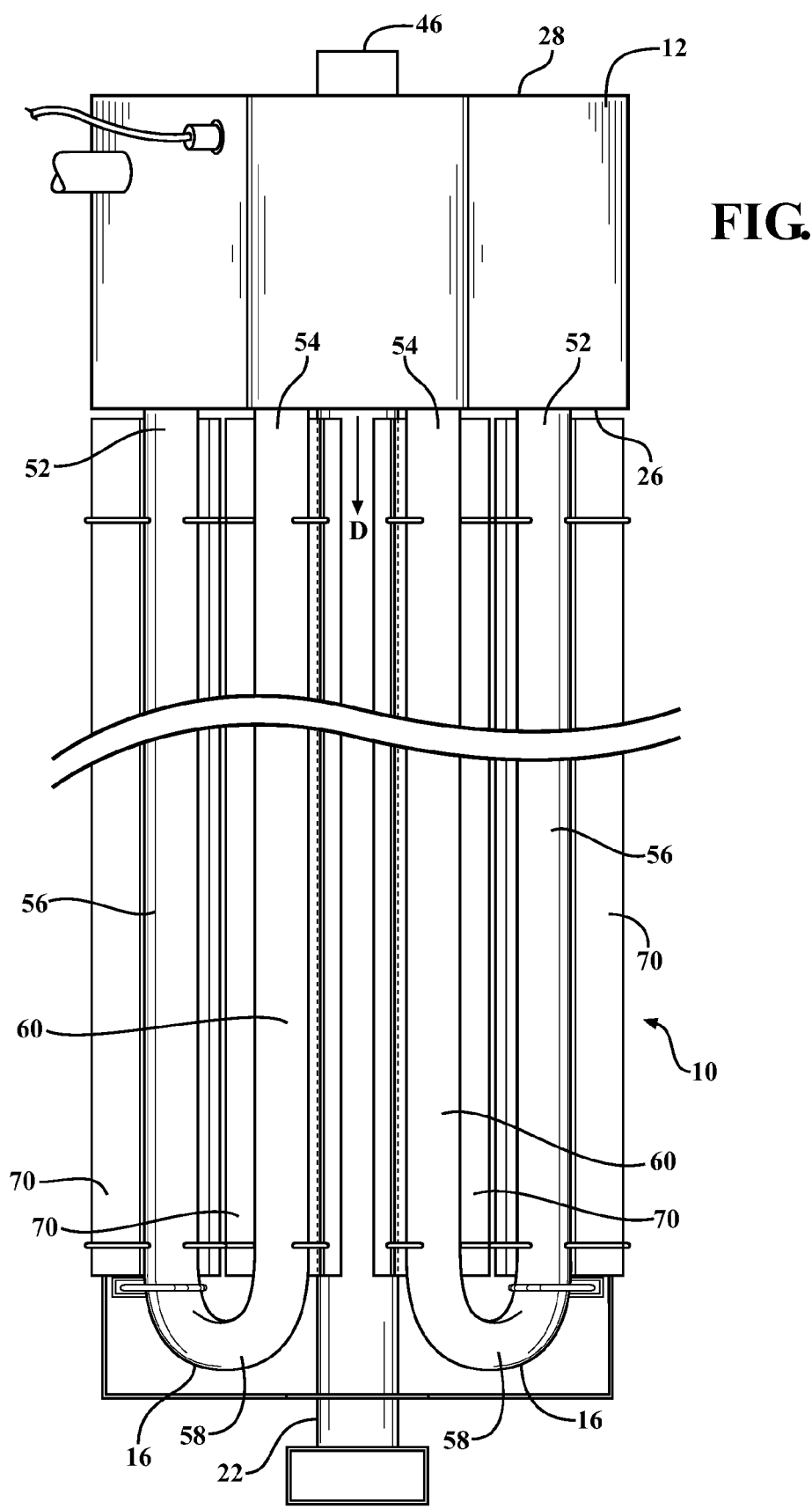
FIG. 2 is a bottom view of the heater of FIG. 1.
Figure 7:
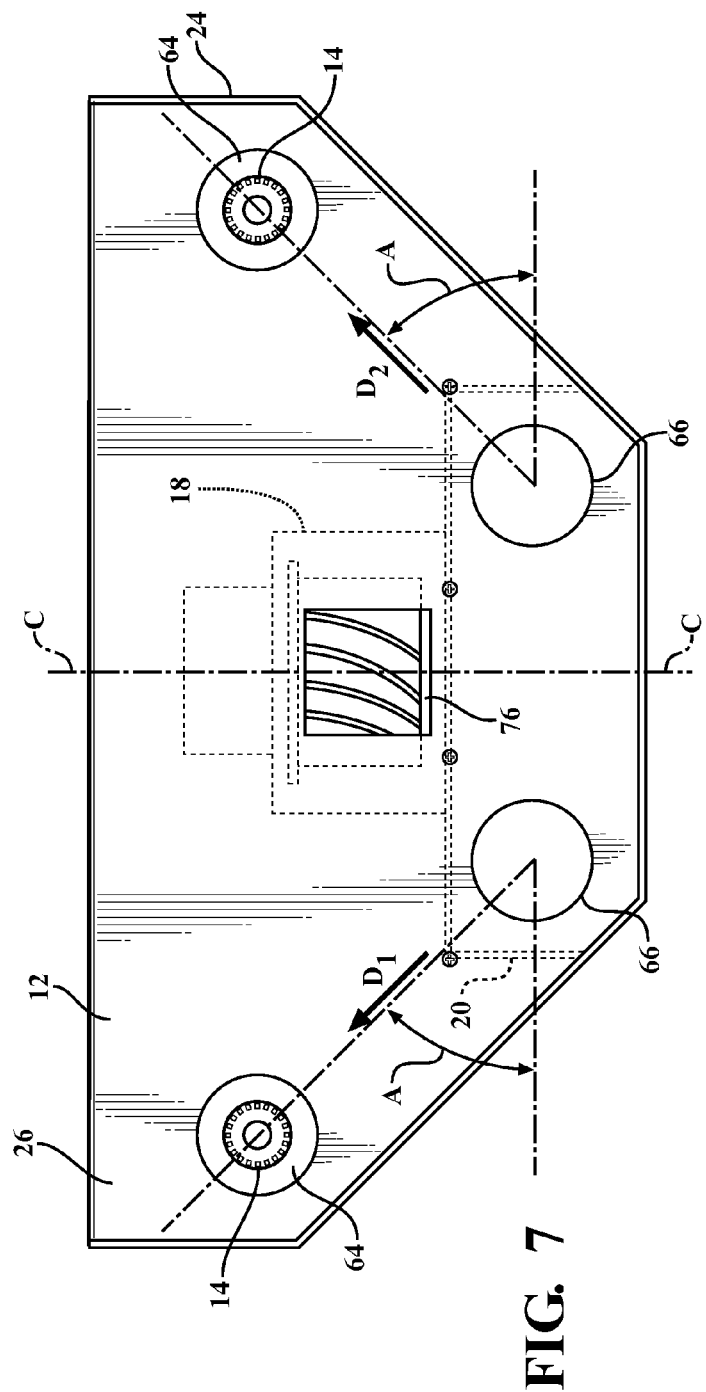
FIG. 7 is a front view of a burner housing of the heater.
Figure 6:
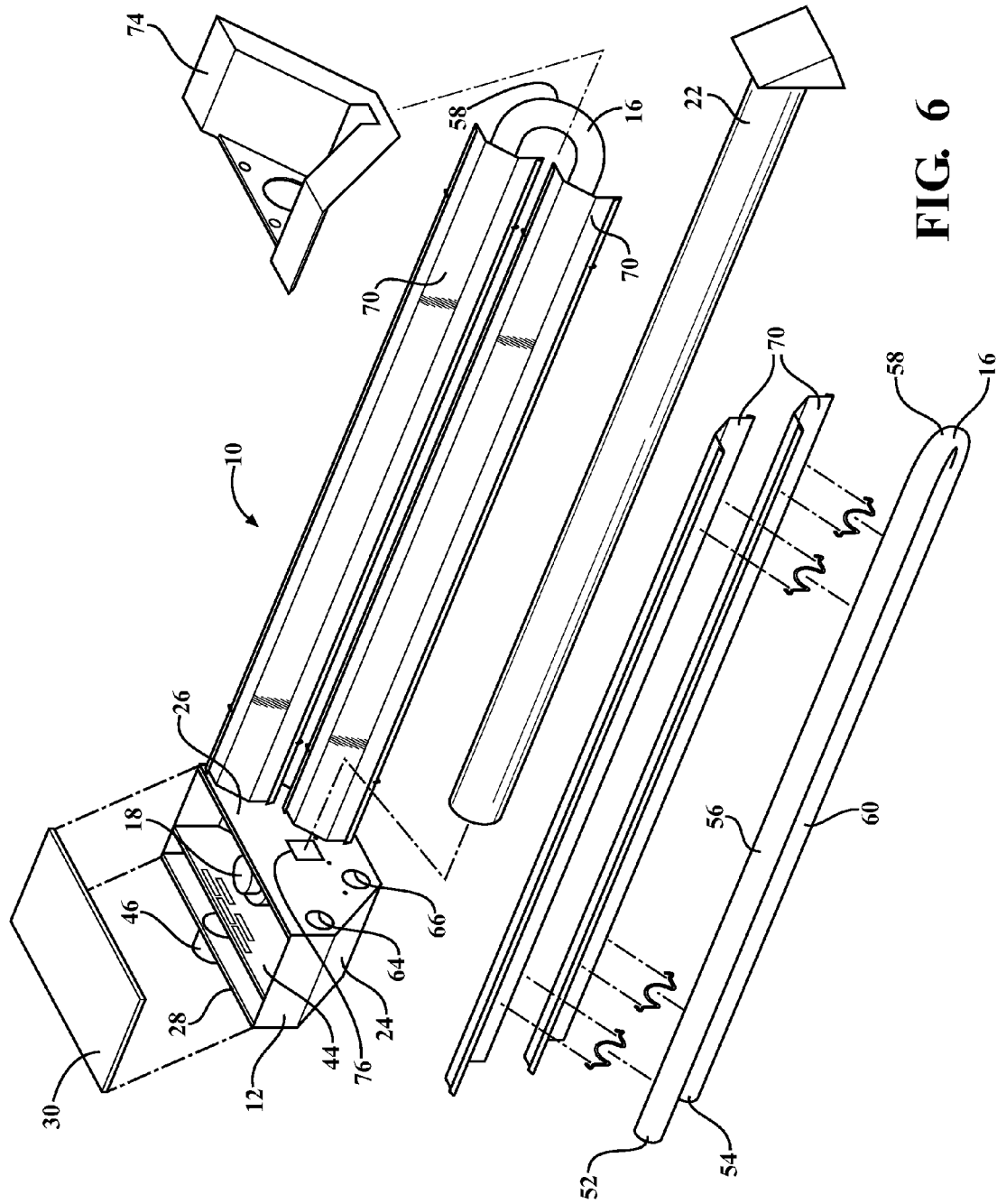
FIG. 6 is a partially exploded view of the heater.
Figure 8:
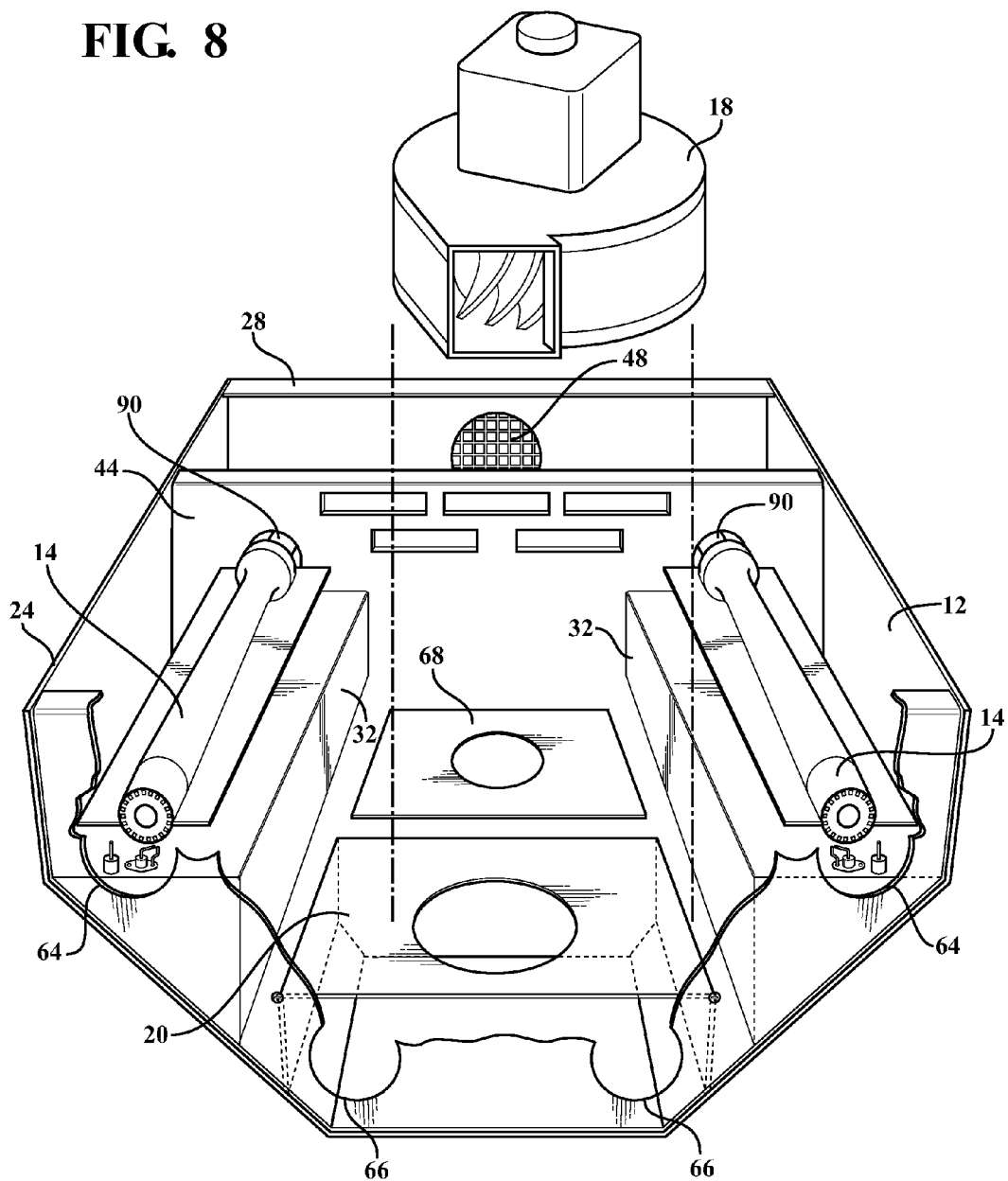
FIG. 8 is a partially cut-away and partially exploded view of the burner housing.

With reference to FIGS. 6-8, the heater 10 includes a burner housing 12, a pair of burners 14 for combusting a fuel and air mixture into heated gas, and a pair of heater tubes 16 extending from and returning to the burner housing 12 for receiving a flame and heated gas from the burners 14 and radiating heat. A fan 18, as shown in FIGS. 7-10, is also in fluid communication with the heater tubes 16 to move the heated gas through the heater tubes 16. As set forth further below, both heater tubes 16 exhaust the heated gas into a collector box 20. An exhaust tube 22, as best shown in FIGS. 1-3, is in fluid communication with the collector box 20 to exhaust the heated gas to the collector box 20. The fan 18 is in communication with the collector box 20 and the exhaust tube 22 to move the heated gas to the collector box 20 and the exhaust tube 22.

With reference to FIGS. 7-10, the burner housing 12 includes a central portion 24 that is concave for receiving components, as set forth further below. A front panel 26, a rear panel 28, and a top 30 are attached to the central portion 24 to generally enclose the components received therein. The burner housing 12 is typically formed of sheet metal but can alternatively be formed of any type of material without departing from the nature of the present invention.

Figure 12:
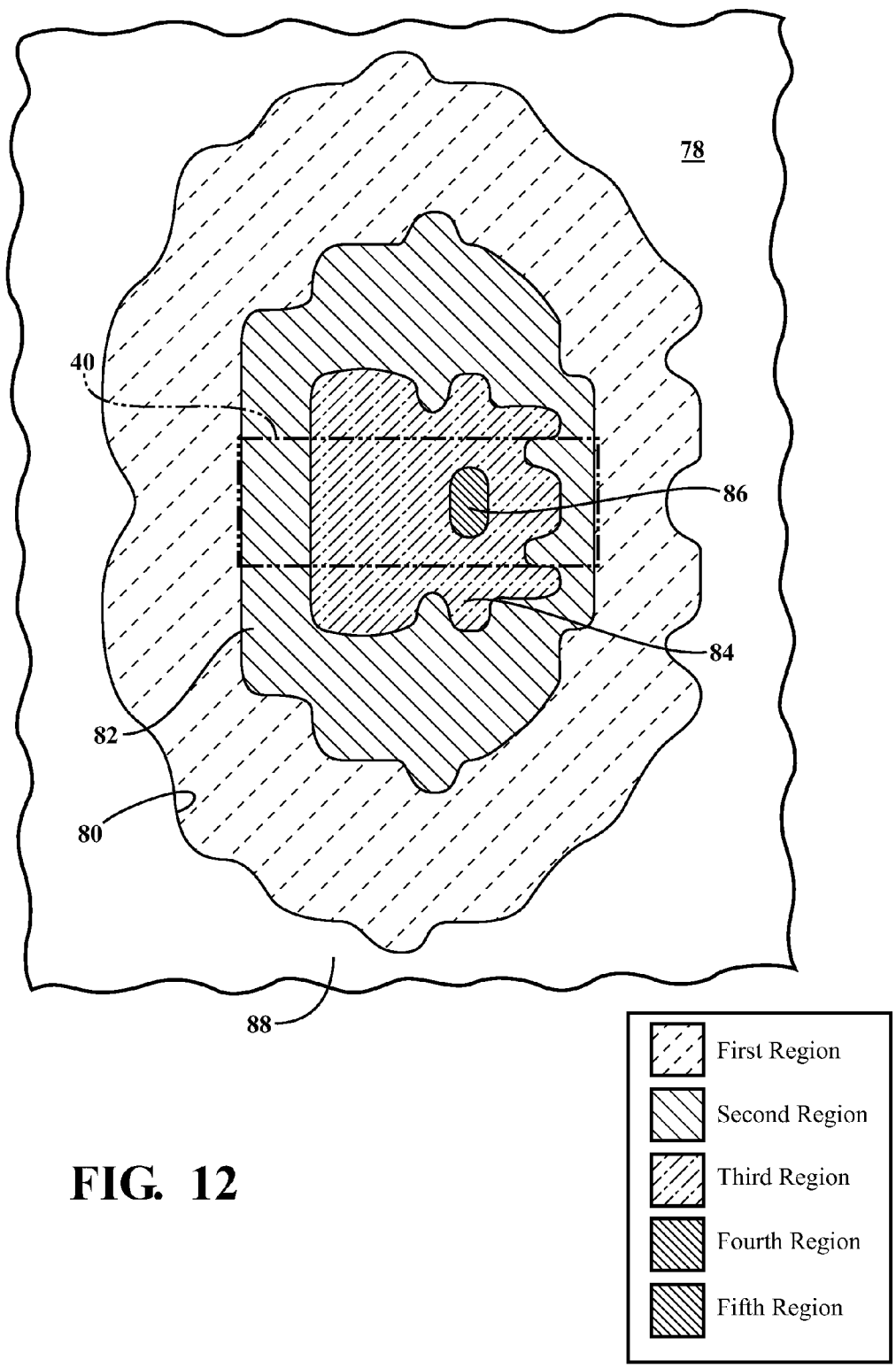
FIG. 12 is a top view of the heater heating an area and illustrating a heating pattern.

With reference to FIG. 8, the pair of burners 14 are spaced from each other in the burner housing 12 for combusting a fuel and air mixture into heated gas. The air and fuel are typically mixed, ignited, and burned in the burner housing 12 and the heater tubes 16. The heated gas flows through and heats the heater tubes 16 so that the heater tubes 16 emit radiant heat. The burners 14 are mounted in the burner housing 12 in spaced relationship from each other such that the heater tubes 16 extend from the burners 14 in spaced relationship to each other to distribute the heat in a generally rectangular heating pattern on the area, such as on floor 78, as shown in FIG. 12. In addition to radiating heat downwardly onto the floor 78, heat is also radiated to the sides of the heater 10.

The burners 14 are typically venturi burners but alternatively can be any type of burner without departing from the nature of the present invention. One example of a suitable burner is that which is commercially available from Becket Gas. The burners 14 are typically of the type that combust light propane and/or natural gas, but can alternatively be any type of burner that burns any type of fuel without departing from the nature of the present invention.

Support boxes 32 are typically mounted in the burner housing 12 to support the burners 14 at a proper location in the burner housing 12. A flame sensor (not numbered) and an igniter (not numbered) are typically mounted on the support boxes 32 between the burners 14 and the heater tubes 16, as shown in FIG. 8.

Figure 10:
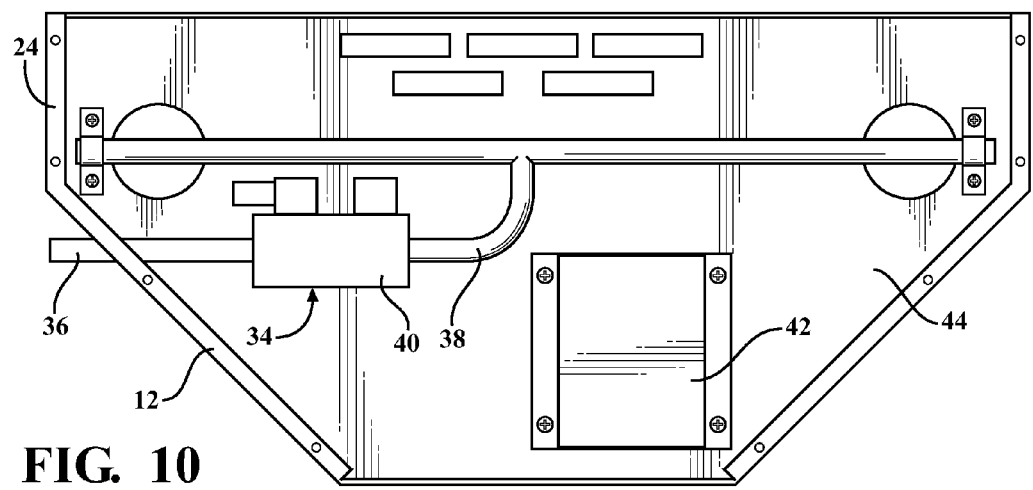
FIG. 10 is a rear view of the burner housing with a rear cover removed.

With reference to FIG. 10, a fuel system 34 is in communication with the burners 14 to supply fuel, e.g., propane or natural gas, to the burners 14. Specifically, the fuel system 34 includes an inlet pipe 36 that for connection to a fuel source (not shown), a supply pipe 38 that splits to connect to each of the burners 14, and a regulator valve 40 disposed between the inlet pipe 36 and the supply pipe 38 to regulate the amount of fuel flowing from the inlet pipe 36 to the supply pipe 38. The supply pipe 38 splits downstream of the regulator valve 40 such that each burner 14 receives generally the same amount of fuel. A gas orifice 90, as shown in FIG. 8, is disposed between the supply pipe 38 and the burners 14.

The regulator valve 40 can be a two-stage valve, i.e., a variable or modulating valve, to selectively vary the supply of fuel to the burners 14. Specifically, the regulator valve 40 can have a high setting and a low setting for supplying a greater or lesser amount of fuel to the burners 14. The regulator valve 40 also has a closed setting to prevent the supply of fuel to the burners 14. The regulator valve 40 can alternatively be a single stage valve having only a single open setting for supplying fuel to the burners 14 and a closed setting for preventing the supply of fuel to the burners 14.

The fuel supply system 34 includes electronics 42 and associated wiring (not shown) to control the regulator valve 40 and the burners 14. The burner housing 12 includes a wall 44 separating the regulator valve 40 and the electronics 42 from burners 14. As best shown in FIG. 10, the electronics 42 are mounted to the wall 44.

Figure 9:
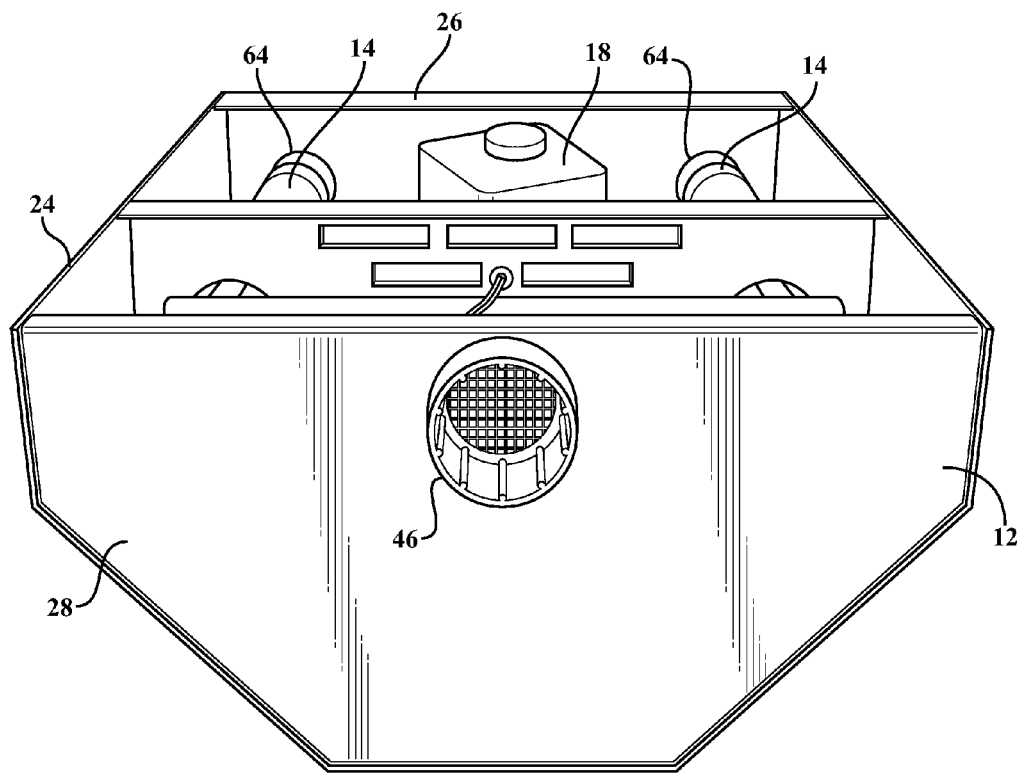
FIG. 9 is a perspective view of a rear of the burner housing.

With reference to FIG. 9, the burner housing 12 has an inlet 46 for supplying air into the burner housing 12. The inlet 46 can be sized so as to meter the amount of air that enters the burner housing 12 through the inlet 46 to enable a proper fuel/air ratio for the burners 14, i.e., to meter the air flow through the heater 10. The inlet 46 typically includes a screen 48 to prevent debris from being drawn into the burner housing 12 through the inlet 46. The inlet 46 is, for example, disposed on the rear panel 28 of the burner housing 12 as best shown in FIG. 9, but alternatively can be disposed at any area of the burner housing 12 without departing from the nature of the present invention.

The heater 10 can include an inlet tube (not shown) connected to the inlet 46 for supplying air to the inlet 46. The inlet tube can extend from the inlet 46 to a location remote from the heater 10 so as to provide fresh air from a location remote from the heater 10 to the heater 10 for combustion, i.e., separate combustion. As such, the burners 14 are supplied with fresh air for a proper burn and the burners 14 do not consume oxygen from the environment in which the heater 10 is located, e.g., to avoid consumption of oxygen in an agricultural enclosure that contains livestock. Such a configuration is beneficial, for example, in environments like chick brooders that have high concentrations of ammonia.

With reference to FIG. 2, the heater tubes 16 each extend away from and return toward the burner housing 12. Specifically, the heater tubes 16 each have an inlet end 52 and an outlet end 54 with the inlet ends 52 coupled to the burner housing 12 such that the heater tubes 16 extend away from the burner housing 12 at the inlet end 52 and back toward the housing at the outlet end 54. Specifically, each of the heater tubes 16 includes a first segment 56 extending from the inlet end 52 away from the burner housing 12 and a second segment 60 returning toward the burner housing 12 to the outlet end 54. The first 56 and second 60 segments typically extend from the burner housing in a common direction D, as shown for example in FIG. 2, to create a generally rectangular heating pattern, as shown in FIG. 12. The first 56 and second 60 segments of the heater tubes 16 are typically spaced from each other and typically extend in parallel.

As best shown in FIGS. 1-3, the heater tubes 16 can have, for example, a U-shape. In such a configuration, the heater tube includes an elbow 58 spaced from the inlet end 52 and the outlet end 54 and connecting the first 56 and second 60 segments. It should be appreciated that the U-shape of the heater tubes 16 is shown for exemplary purposes and that the heater tubes 16 can be any shape that extends away from and returns toward the burner housing 12 such as, for example, a V-shaped configuration, a circular configuration, an S-shaped configuration, etc.

With continued reference to FIGS. 1-3, the outlet end 54 of each heater tube 16 can be coupled to the burner housing 12, e.g., such that the second segment 60 extends from the elbow 58 to the burner housing 12; however, as set forth further below, it should be appreciated that the outlet ends 54 can be spaced from the burner housing 12.

Figure 5:
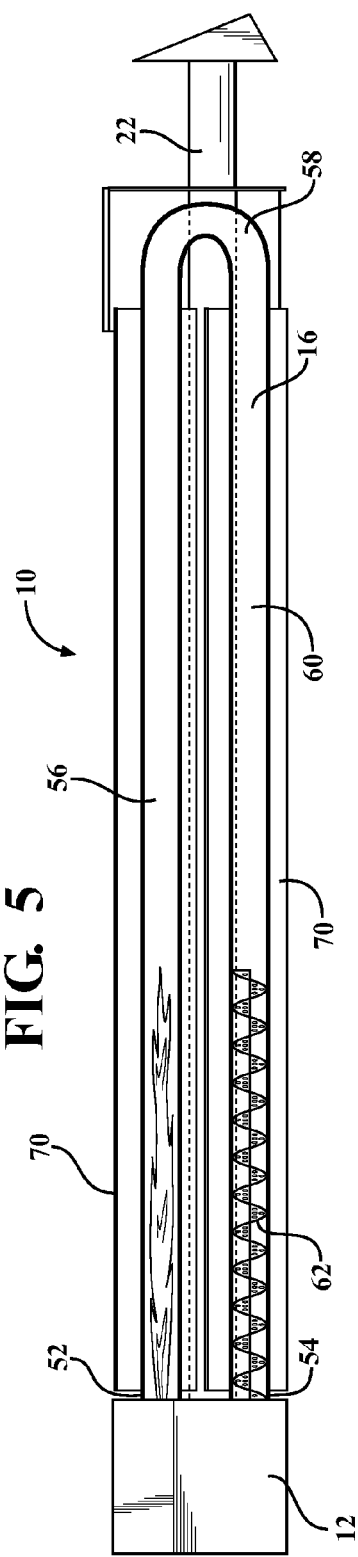
FIG. 5 is a side view of the heater with a heater tube shown in cross-section.

With reference to FIG. 5, the inlet ends 52 are coupled to the burner housing 12 in communication with the burners 14 for receiving the heated gas from the burners 14. The inlet ends 52 are typically disposed adjacent the burners 14 such that a flame from the burner 14 extends from the burner 14 into the inlet end 52 of the heater tubes 16,. As also shown in FIG. 5, the heater tubes 16 typically include turbulators 62 that interrupt the fluid flow of the heated gas and increase turbulent fluid flow of the heated gas to encourage heat transfer from the heated gas to the heater tubes 16.

With reference to FIGS. 4 and 7, the collector box 20 is in communication with the outlet ends 54 of each of the heater tubes 16 for receiving the heated gas from the heater tubes 16 and, as set forth above, the fan 18 is in communication with the collector box 20 to move the heated gas from the burners 14 to the collector box 20. Said differently, the collector box 20 receives the heated gas from both of the heater tubes 16 so as to create a common collection point for the heated gas from both of the heater tubes 16. The collector box 20 is typically connected to the front panel 26 of the burner housing 12 to prevent the heated gas from escaping from the outlet ends 54 of the heater tubes 16 to the interior of the burner housing 12.

The collector box 20 is typically disposed in the burner housing 12. As such, the second segment 60 extends to the burner housing 12 so as to communicate with the collector box 20, i.e., heater tubes 16 extend away from the burner housing 12 at the inlet end 52 and return to the burner housing 12 at the outlet end 54. The fan 18 is also typically disposed in the burner housing 12 and is typically mounted directly to the collector box 20, such as on top of the collector box 20 as best shown in FIGS. 7 and 8. The location of the collector box 20 and the fan 18 inside the burner housing 12 aids in compact packaging and reduced size of the heater 10. Alternatively, the collector box 20 and/or the fan 18 can be disposed outside of the burner housing 12. In such a configuration where the collector box 20 is disposed outside of the burner housing 12, the heater tubes 16 do not return to the burner housing 12 but instead terminate at the collector box 20. The fan 18 draws the hot gas from the heater tubes 16, i.e., the fan 18 creates a negative pressure to pull the hot gas. Alternatively, the fan 18 could be arranged in a different position such that the fan 18 pushes the hot gas through the heater tubes 16 to the collector box 20.

The collector box 20 can be disposed in the burner housing 12 between the burners 14 of the heater tubes 16. Further, as best shown in FIGS. 2 and 4, the inlet ends 52 of the heater tubes 16 are spaced from the collector box 20 on opposite sides of the collector box 20 such that the inlet ends 52 are spaced apart further than the outlet ends 54 for uniformly distributing heat from the pair of heater tubes 16. In other words, as best shown in FIG. 4, a horizontal distance between the inlet ends 52 is greater than a horizontal distance between the outlet ends 54. The inlet ends 52 and the outlet ends 54 are spaced relative to the burner housing 12 in a generally symmetrical pattern about a center line C of the burner housing 12 such that the outlet ends 54 are each spaced closer to the center line C than are the inlet ends 52, i.e., the inlet ends 52 are disposed outwardly to the sides of the outlet ends 54.

Said differently, the outlet ends 54 of the heater tubes 16 are adjacent each other at the burner housing 12. Each of the inlet ends 52 of the heater tubes 16 are spaced in different directions D1, D2 from the outlet ends 54 at the burner housing 12. Specifically, with reference to FIGS. 4 and 7, the inlet end 52 of one of the heater tubes 16 is spaced from the outlet end 54 in a first direction D1 and the inlet end 54 of the other heater tube 16 is spaced from the outlet end 54 in a second direction D2 that is different than the first direction D1. More specifically, the inlet ends 52 of the heater tubes 16 are disposed upwardly and outwardly from the outlet ends 54, as shown in FIGS. 4 and 7. As a result, the inlet ends 52 are spaced apart from each other a greater distance than the outlet ends 54 are spaced apart.

Since the inlet ends 52 are spaced apart further than the outlet ends 54, the first segments 56 of the heater tubes 16 are space apart further than the second segments 60 of the heater tubes 16. Since the inlet end 52 of the heater tubes 16 are adjacent the burners 14 and receive the flame of the burner 14, the first segments 56 of the heater tubes 16 are hotter than the second segments 60 of the heater tubes 16, i.e., the temperature of the heater tube 16 decreases from the inlet end 52 to the outlet end 54.

As such, the location of the second segments 60 adjacent each other and between the hotter first segments 56 distributes low intensity heat in a generally uniform rectangular pattern, i.e., a balanced heat signature. In such a configuration, the hotter first segments 56 radiate some heat outwardly, i.e., downwardly to the side of the heater 10, to avoid creating a hot center in the heat pattern directly below the heater 10. Further, because the heat originates from two areas, i.e., the overall heat output is split between two burners 14 spaced from each other, the heat from each of the heater tubes 16 is of a low intensity and the radiant heat pattern can be easily optimized by adjusting the heat output of either or both of the heater tubes 16.

As best shown in FIG. 4, in addition to being disposed outwardly from the outlet ends 54, the inlet ends 52 can also be disposed above the outlet ends 54 to further enable the radiation of the heat outwardly to avoid the hot center in the heat pattern directly below the heater 10. As best shown in FIG. 4, the inlet ends 52 are disposed at an angle A relative to the inlet ends 52. The angle A can, for example, be a 45° angle as shown in FIG. 4 but alternatively can be of any magnitude without departing from the nature of the present invention.

FIG. 12 shows an exemplary heat pattern of the heater 10 and a heat pattern of a prior art heater 10'. The heat patterns include regions 80, 80', 82, 82', 84, 84', 86, 86', 88 of varying temperature ranges on the area, e.g., the floor 78. For example, a first region 80, 80' represents a temperature rise of 10-20° F., a second region 82, 82' represents a temperature rise of 20-30° F., a third region 84, 84' represents a temperature rise of 30-40° F., and a fourth region 86, 86' represents a temperature rise of over 40° F. A fifth region 88, shown in FIG. 12, represents a temperature rise of 0-10° F. By way of non-limiting example, the heater 10 in FIG. 12 is suspended 8 ft. above the floor 78, and the heater is 10 ft. long, i.e., horizontally in FIG. 12. The heat pattern is 30 ft. long, i.e., vertically in FIG. 12, and is 18 ft. wide, i.e., horizontally in FIG. 12.

In comparison to the heat pattern of the prior art heater 10' shown in FIG. 13, the heat pattern of the heater 10 is relatively uniform, i.e., each of the individual regions 80, 82, 84, 86 of varying temperature ranges in FIG. 12 are larger such that the temperature change across the floor 78 is gradual. In addition, the heat pattern of the heater 10 shown in FIG. 12 includes a total of only four individual regions 80, 82, 84, 86 that are concentrically arranged with one another resulting in gradual temperature changes. In contrast, heat pattern of the prior art heater 10' shown in FIG. 13 includes a total of six regions 80', 82', 84', 86' and each region 80', 82', 84', 86' is relatively small, i.e., the heat pattern in FIG. 13 has more drastic temperature changes and includes hot spots.

The front panel 26 of the burner housing 12 defines burner holes 64 and collector holes 64. The burner holes 64 are located at the inlet ends 52 of the heater tubes 16 for communication between the burner housing 12 and the heater tube 16. The burners 14 are typically located in the burner housing 12 opposite the front panel 26 from the inlet end 52 of the heater tubes 16. Alternatively, the burners 14 can extend into the inlet ends 52 of the heater tubes 16. The collector holes 64 are disposed between the outlet ends 54 and the collector box 20 for communicating between the heater tube 16 and the collector box 20. In such a configuration, since the burner holes 64 and the collector holes 64 are in a common plane, i.e., the plane defined by the front panel 26, the inlet ends 52 and the outlet ends 54 of the heater tubes 16 are disposed in the common plane.

The front panel 26 also defines a fan exhaust hole 76 in communication with the fan 18. As best shown in FIG. 7, the fan exhaust hole 76 is typically disposed along the center line C of the burner housing 12 above the collector holes 64. In the alternative to being disposed on the front panel 26, the fan exhaust hole 76 can be located on any other portion of the burner housing 12. In such a configuration, the fan 18 can be positioned to be in direct communication with the fan exhaust hole 76 or can be in indirect communication with the fan exhaust hole 76, e.g., via tubing.

The exhaust tube 22 extends from the fan exhaust hole 76 to exhaust the heated gas at a location remote from the heater 10. Alternatively, the exhaust tube 22 can dump the heated gas below the heater 10 to provide additional heat. The length of the exhaust tube 22 is shown in the Figures for exemplary purposes and the exhaust tube 22 can be of any suitable length. The exhaust tube 22 can be disposed between the heater tubes 16, as shown in FIG. 1, to aid in compact packaging and reduced size of the heater 10.

The fan 18 is typically a centrifugal fan 18 but alternatively could be any type of fan 18 without departing from the nature of the present invention. As shown in FIG. 8, a restrictor plate 68 can be disposed between the fan 18 and the collector box 20 to restrict the air flow through the fan 18, i.e., to meter air flow through the heater 10. The restrictor plate 68 can be fixed in position between the fan 18 and the collector box 20 to maintain a constant restriction of the air flow through the fan 18. Alternatively, the restrictor plate 68 can be adjustable, e.g., from a remote location exterior to the heater 10, to adjust the restriction of the air flow.

Figure 11:
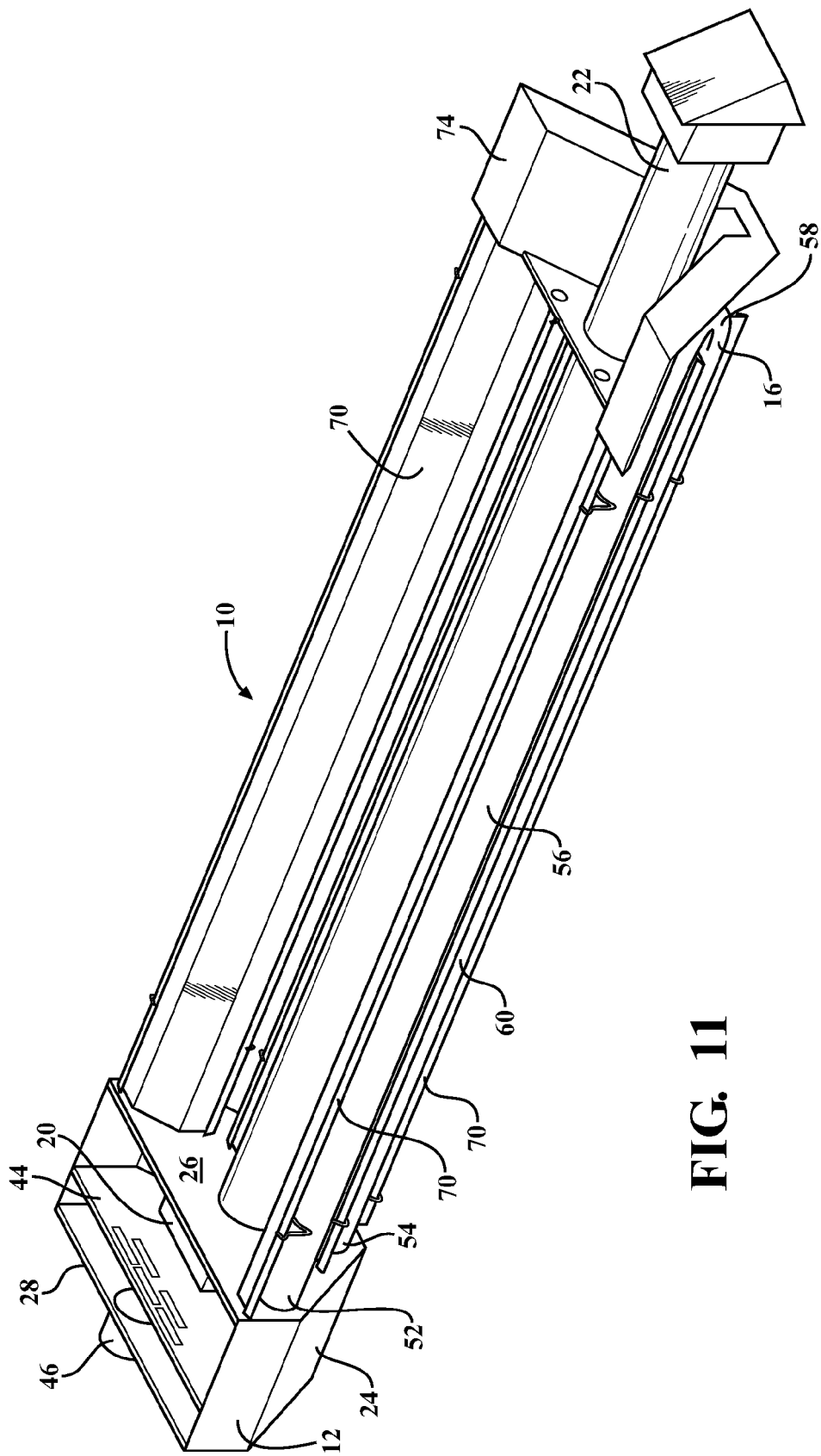
FIG. 11 is a perspective view of an alternative embodiment of the heater.

As shown in FIGS. 7 and 8 and as set forth above, the fan 18 can be disposed in the burner housing 12. In such a configuration, the fan 18 pulls heated gas through the heater tubes 16 and pushes the heated gas through the exhaust tube 22. Alternatively, as shown in FIG. 11, the fan 18 can be disposed along the exhaust tube 22 spaced from the burner housing 12 such that the fan 18 pulls the heated gas through the exhaust tube 22.

Reflectors 70 are coupled to heater tubes 16. Specifically, as shown in FIG. 1, four reflectors 70 are coupled to the heater tubes 16 with one reflector 70 coupled to each of the first segments 56 and with one reflector 70 coupled to each of the second segments 60. The reflectors 70 reflect the radiant heat outwardly toward the area to be heated in a fashion to not be concentrated, i.e., to be generally uniform. The reflectors 70 can be adjustable, e.g., rotatable about the first 56 and second segments 60, so that the direction of the reflection of the radiant heat can be adjusted. It should be appreciated that the heater 10 can include any type and any number of reflectors 70 without departing from the nature of the present invention.

The heater 10 is typically suspended with the use of hangers 72 such as chains, as shown in FIG. 1. The heater 10 can be suspended at any height above the area to be heated. The hangers 72 are typically connected to the burner housing 12 and extend from the burner housing 12 to a rafter or other support. The heater 10 also includes a support member 74 spaced from the burner housing 12 and engaged with the heater tubes 16. A hanger 72 extends from the support member 74 to the rafter or other support. However, it should be appreciated that the heater 10 can be suspended in any fashion without departing from the nature of the present invention.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A heater comprising:
 a burner housing having a front panel and an inlet for supplying air into said burner housing;
 a plurality of burners spaced from each other in said burner housing for combusting a fuel and air mixture into heated gas;
 a plurality of heater tubes each extending from and returning to said front panel of said burner housing for radiating heat, said heater tubes each having an inlet end and an outlet end with said inlet ends in communication with said burners for receiving the heated gas from said burners;
 a collector box disposed in said burner housing in communication with said outlet ends of said heater tubes for receiving the heated gas from said heater tubes; and
 a fan in communication with said collector box to move the heated gas from said burners to said collector box;
 said outlet ends of said heater tubes being adjacent each other at said burner housing and each of said inlet ends of said heater tubes being spaced in different directions from said outlet ends at said front panel of said burner housing.

2. A heater as set forth in claim 1 wherein said inlet ends of said heater tubes are disposed upwardly and outwardly from said outlet ends.

3. A heater as set forth in claim 1 wherein said inlet ends and said outlet ends of said heater tubes are disposed in a common plane.

4. A heater as set forth in claim 1 wherein said front panel defines burner holes at said inlet ends of said heater tubes for communication between said burner housing and said heater tubes and defines collector holes between said outlet ends of said heater tubes and said collector box for communicating between said heater tubes and said collector box.

5. A heater as set forth in claim 4 wherein said fan is disposed in said burner housing between said burners for drawing the heated gas from said heater tubes.

6. A heater as set forth in claim 5 wherein said front panel defines a fan exhaust hole in communication with said fan and an exhaust tube extending from said fan exhaust hole.

7. A heater as set forth in claim 6 wherein said burner holes, said collector holes, and said fan exhaust hole are in a common plane.

8. A heater as set forth in claim 6 wherein said exhaust tube is disposed between said heater tubes.

9. A heater as set forth in claim 1 wherein each of said heater tubes includes a first segment extending from said inlet end away from said burner housing and a second segment returning toward said burner housing to said outlet end.

10. A heater as set forth in claim 9 wherein each heater tube includes an elbow spaced from said inlet end and said outlet end and connecting said first and second segments.

11. A heater as set forth in claim 9 wherein said first segments and said second segments of said heater tubes extend from said burner housing in a common direction.

12. A heater as set forth in claim 11 wherein said first segments and said second segments of said heater tubes are spaced from each other and extend in parallel.

13. A heater as set forth in claim 1 further comprising an inlet tube connected to said inlet for supplying air to said inlet.

14. A heater as set forth in claim 1 further comprising a fuel system in communication with said burners for supplying fuel to said burners.

15. A heater as set forth in claim 1 further comprising an igniter disposed in said burner housing for igniting a flame on said burners.

16. A heater as set forth in claim 1 wherein said collector box is disposed between said burners.

17. A heater as set forth in claim 1 wherein said heater produces a heating pattern including five concentric temperature regions with each temperature region having a 10° F. temperature range and the temperature range of each region being 10° F. less than the temperature range of the adjacent radially inwardly temperature region.

18. A heater comprising:
a burner housing having an inlet for supplying air into said burner housing;
a plurality of burners spaced from each other in said burner housing for combusting a fuel and air mixture into heated gas;
a plurality of heater tubes each extending from and returning to said burner housing for radiating heat, said heater tubes each having an inlet end and an outlet end disposed in a common plane with said inlet ends in communication with said burners for receiving the heated gas from said burners;
each heater tubes including a first segment extending from said inlet end away from said burner housing and a second segment returning toward said burner housing to said outlet end, said first segments and said second segments of said heater tubes extending from said burner housing in a common direction;
a collector box disposed in said burner housing in communication with said outlet ends of said heater tubes between said burners for receiving the heated gas from said heater tubes; and
a fan in communication with said collector box to move the heated gas from said burners to said collector box;
said outlet ends of said heater tubes being adjacent each other at said burner housing and each of said inlet ends of said heater tubes are disposed upwardly and outwardly from said outlet ends.

19. A heater as set forth in claim 18 wherein said burner housing includes a front panel defining burner holes at said inlet ends of said heater tubes for communication between said burner housing and said heater tubes and defining collector holes between said outlet ends of said heater tubes and said collector box for communicating between said heater tubes and said collector box.

20. A heater as set forth in claim 18 wherein said first segments and said second segments of said heater tubes are spaced from each other and extend in parallel.

21. A heater as set forth in claim 18 wherein each heater tube includes an elbow spaced from said inlet end and said outlet end and connecting said first and second segments.

22. A heater as set forth in claim 18 wherein said fan is disposed in said burner housing between said burners for drawing the heated gas from said heater tubes.

* * * * *